US007600934B2

(12) United States Patent
Guillen et al.

(10) Patent No.: US 7,600,934 B2
(45) Date of Patent: Oct. 13, 2009

(54) PRINTING AND LAMINATING APPARATUS AND METHOD

(75) Inventors: Roberto Guillen, Barcelona (ES); Francisco Javier Pozuelo, Barcelona (ES); Joan Matias Guerra, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 916 days.

(21) Appl. No.: 10/437,993

(22) Filed: May 15, 2003

(65) Prior Publication Data

US 2004/0017466 A1 Jan. 29, 2004

(30) Foreign Application Priority Data

May 17, 2002 (GB) ................................ 0211244.9

(51) Int. Cl.
*B32B 38/04* (2006.01)
*B32B 38/14* (2006.01)

(52) U.S. Cl. .................. 400/120.18; 347/104; 347/212; 156/250; 156/353; 156/361; 156/384; 156/510

(58) Field of Classification Search ................. 156/250, 156/353, 358, 361, 384, 387, 510; 400/120.18; 347/104, 212
See application file for complete search history.

(56) References Cited

U.S. PATENT DOCUMENTS 4,147,104 A 4/1979 Zernov et al.
4,933,043 A * 6/1990 Instance ..................... 156/248
5,211,800 A * 5/1993 Taguchi et al. .............. 156/521
5,316,609 A * 5/1994 Guither et al. .............. 156/301
5,368,677 A * 11/1994 Ueda et al. .................. 156/362
5,637,174 A * 6/1997 Field et al. .................. 156/256
5,807,461 A * 9/1998 Hagstrom ................... 156/361
6,106,666 A 8/2000 Martin
6,179,030 B1 1/2001 Rietheimer
6,261,012 B1 7/2001 Haas et al.
6,264,296 B1 7/2001 Klinefelter et al.
6,409,872 B1 6/2002 Campion et al.
6,517,200 B1 * 2/2003 Ramaswamy et al. ....... 347/104
6,520,080 B1 2/2003 Fried
6,561,248 B2 * 5/2003 Sasaki et al. ................ 156/521
6,585,366 B2 7/2003 Nagata et al.
2002/0027586 A1 * 3/2002 Kikuchi et al. .............. 347/104
2003/0126962 A1 7/2003 Bland et al.
2004/0003733 A1 1/2004 Guillen et al.

FOREIGN PATENT DOCUMENTS

EP 0 835 739 4/1998
EP 1188576 A2 * 3/2002

* cited by examiner

*Primary Examiner*—Jill E Culler

(57) ABSTRACT

A printing apparatus includes a printer, a laminator device and feeding arrangement for feeding to said laminator device, in an integrated operation, media that is outputted from said printer. The apparatus also includes an arrangement for performing lamination only on selected portions of the print media.

13 Claims, 6 Drawing Sheets

PRINTING AND LAMINATING APPARATUS AND METHOD

BACKGROUND OF THE INVENTION

1. Field of the Invention

The present invention relates to a printing apparatus which comprises a laminator device that allows lamination of print media, and to a method for printing and laminating media.

2. Description of the Related Art

Known in the state of the art are laminator apparatus which allow lamination or plasticization of a picture or other plot, i.e. cover it with at least one layer of a protective film which is generally a transparent plastic film.

In order to laminate a plot printed in a printing apparatus, prior art devices required the user to wait until the end of the printing operation, manually take the printed plot from the printer to a stand-alone laminator, and carefully introduce the plot into the latter.

This method has the drawback of requiring user intervention between the printing and the laminating operations, especially in the case of professional use of the devices when it is also costly.

Also known, e.g. from U.S. Pat. No. 6,264,296, is a small format ID card printer which includes a laminating station; each ID card is printed and dried and then fed to the laminating station.

It would be desirable to have a more versatile apparatus, e.g. an apparatus which can be used for printing and laminating plots of different sizes, and this in unattended manner.

In particular, it would be desirable to be able to perform in-line lamination for different lengths of plot especially in large format printing apparatus, such as inkjet plotters.

In this kind of apparatus, handling of the media is in itself complicated due to its size and behaviour, and in-line lamination adds to the problems to be solved; furthermore, since these printers are generally for professional use, it is desirable to provide enhanced versatility and unattended operation as far as possible.

On the other hand, it would be desirable to have an apparatus in which these advantages can be achieved using different printing and laminating techniques, including for example hot lamination.

SUMMARY OF THE INVENTION

According to a first aspect, the invention relates to a printing apparatus comprising a printer, a laminator device and feeding means for feeding to said laminator device, in an integrated operation, media that is outputted from said printer, said apparatus comprising means for performing lamination only on selected portions of the print media.

Such an apparatus is highly versatile. It allows a user to work with media and plots of a wide range of lengths and to obtain products with different finishing, and thus different degrees of cost and quality.

In some embodiments, said means for performing lamination only on selected portions of the print media comprise means for cutting the media at the outlet of the printer.

In this case the apparatus may further comprise a switching device for selectively directing the leading edge of the media that leaves the printer towards the feeding means of the laminator device or towards non-laminated media storing means.

This feature allows a versatile apparatus producing laminated and non-laminated plots and switching from one type to another while working unattended.

In one embodiment, the media between the printer and the laminator device forms a loose media buffer. The buffer avoids tension on the media and allows to compensate the different advance speed profiles of the printer and the laminator.

In one embodiment, the laminator device is arranged substantially below (viz., under) the printer.

This layout saves floor space and allows to feed the print media to the laminator device keeping the printed side facing outwards, reducing the risk of contact with surfaces of the apparatus.

The media may be a web of media on which are printed several consecutive plots.

In one embodiment, the printer is an inkjet printer.

In one embodiment, said printer is a large-format printer which is able to handle media of a width of more than 24 inches.

According to another aspect, the invention relates to a printing apparatus comprising a printer for printing a plurality of plots on a web of media and a laminator device for laminating said plots in an integrated operation when they leave said printer, said apparatus further comprising cutting means for cutting said media between at least some consecutive printed plots, and feeding means for feeding to said laminator device the media that leaves said printer.

Such an apparatus is simple in construction and allows the printing and lamination of any length of media, and several plots of different lengths, and may work in unattended mode if the plots are all laminated.

Preferably, such an apparatus further comprises means for determining whether after a plot the media has to be cut or not, depending on the length of the plot itself and on the time during which the printing operation is interrupted after the completion of the plot.

In one embodiment, following lamination said selected portions of the print media which have been laminated are supported on at least one continuous web of a lamination film, whereby said film acts as a carrier for said media.

Thus, all the laminated media, which may include cut media portions, is supported on a continuous web of film and can be easily collected on a take-up reel.

According to a further aspect, the invention also relates to a laminator device, said device being built as a kit which can be attached to a printing apparatus as described above.

In another aspect, the invention relates to a data structure for a printing file to be used in a printing apparatus as described, said data structure comprising printing data and at least a variable for lamination instructions, said variable being readable by control means of the apparatus for controlling lamination of a printed plot associated to said printing file.

The integration of a lamination variable in the printing file allows the user to simply input or import the file, and the printing apparatus itself will perform the control of the operation of the laminator device, to laminate or not laminate the corresponding plot.

According to one further aspect, the invention relates to a method for printing and laminating media, comprising printing on a media in a printer, feeding at least part of said print media to a laminator device in an integrated operation, and performing lamination only on selected portions of said print media.

In some embodiments, the method may comprise cutting the media at an outlet of the printer.

In the latter case, the method may further comprise selectively directing the leading edge of the cut media that leaves the printer towards feeding means of the laminator device or towards non-laminated media storing means.

Finally, in another aspect the invention relates to a method for printing and laminating media, comprising printing a plurality of plots on a web of media in a printer, cutting said media between at least some consecutive printed plots, and feeding to a laminator device in an integrated operation at least some of the media that leaves said printer.

Such a method may further comprise the step of determining whether after a plot the media has to be cut or not, depending on the length of the plot itself and on the time during which the printing operation is interrupted after the completion of the plot

BRIEF DESCRIPTION OF THE DRAWINGS

Particular embodiments of the present invention will be described in the following, only by way of non-limiting example, with reference to the appended drawings, in which.

DETAILED DESCRIPTION OF THE EXEMPLARY EMBODIMENTS

Figure 1:
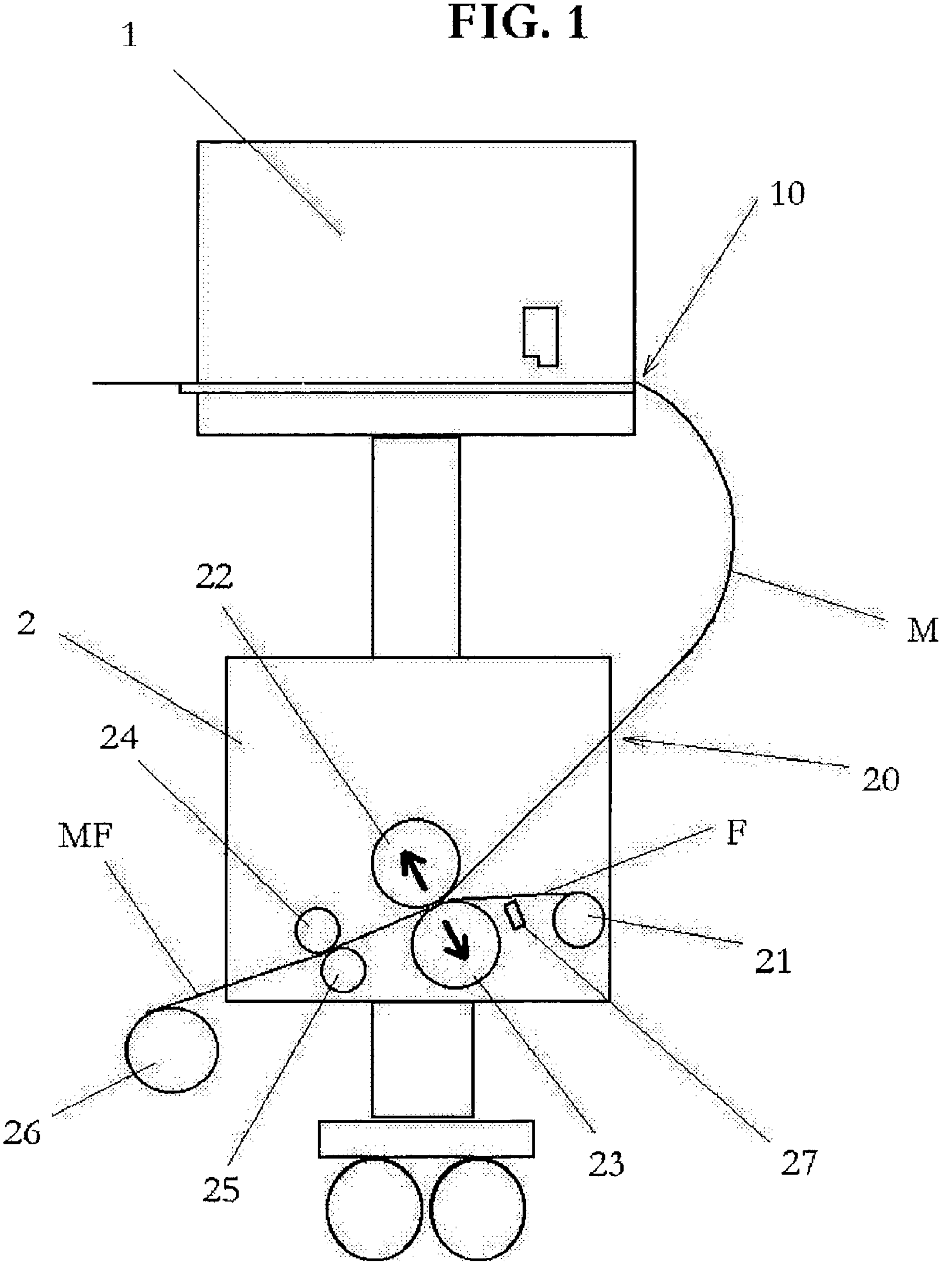
FIG. 1 is a schematic view in side elevation of a printing device according to an embodiment of the invention.

FIG. 1 shows an embodiment of the present invention in which a printing device 1, for example an inkjet printer, is provided with a laminator device 2 in one integrated apparatus. The laminator will usually perform a thermally activated operation, but it could also use any other kind of process, including cold lamination.

By 'integrated' apparatus it is herein meant that the devices 1 and 2 may operate in succession, a media being able to pass from one device to the other, such that the media may be printed and thereafter laminated by the apparatus in a continuous operation, without normally requiring manual intervention.

The printer and the laminator may exchange commands, for example electronically, and the two devices may be physically combined by means of mechanical linkages.

In the figure, a media M is printed in the printing device 1 and leaves through the outlet 10 thereof, and is then fed to the laminator 2 through its inlet 20; the media M is kept loose in the region between the printer and the laminator, forming a buffer that allows to accommodate the different speed profiles of the printer and the laminator.

In this regard, it should be noted that in order to avoid defects the laminator should not be stopped in the middle of a plot; a stop during lamination is especially undesirable in the case of thermally activated lamination, since the media and lamination film would be locally subject to an excess of heat. In contrast, the printing operation may be incremental, for example in the case of an inkjet printer with a reciprocating carriage.

Furthermore, the length of media M between the printer and the laminator is preferably not under tension: since the process works in a continuous manner, i.e. the printer may be printing while the laminator is laminating, it is advisable to avoid 'pulling' the media out of the printer, because this could cause defects in the plot being printed.

The laminator holds at least a roll 21 of a suitable film F; such a film F may comprise a layer of plastic material and a layer of thermally activable adhesive. There can also be a second roll of film (not shown), if it is desired to laminate both sides of the media.

The laminator 2 also comprises a pair of idle laminator rolls 22 and 23, which can also be referred to as a 'laminating nip', through which the media M and film F are conducted. Rolls 22 and 23 are suitable for applying pressure and heat to the media and film, in order to perform the laminating operation causing the film to adhere to the print media.

Downstream of the laminator rolls, the laminated media M with the film F is engaged by a pair of driving rollers 24,25 which cause it to travel through the laminator; downstream of these driving rollers, it is wound on a take-up reel 26.

The operation of the apparatus is thus as follows: media M printed and outputted by the printing device 1 is pulled into the laminator 2 by the driving rollers 24,25, and is laminated together with one or two films F by applying pressure and heat through the idle lamination rolls 22,23. The laminated media MF is then wound on the take-up reel 26.

In order to provide a more versatile apparatus, it is foreseen that each of a plurality of plots printed on a continuous web of media M in the printing device 1 can be laminated or not laminated, as desired.

For this purpose, one possibility is to provide laminator rolls 23,24 which are displaceable between a closed or laminating position and an open or inactive position, as shown by the arrows in FIG. 1, and cutting means 27 for cutting the film F, such that it is possible to let a printed plot pass through the laminator without being laminated.

When the printing operation on a plot is finished, blank media may be outputted from the printer while the lamination operation is completed; then this blank media can be drawn back into the printer, in order to avoid media waste.

Figure 2:
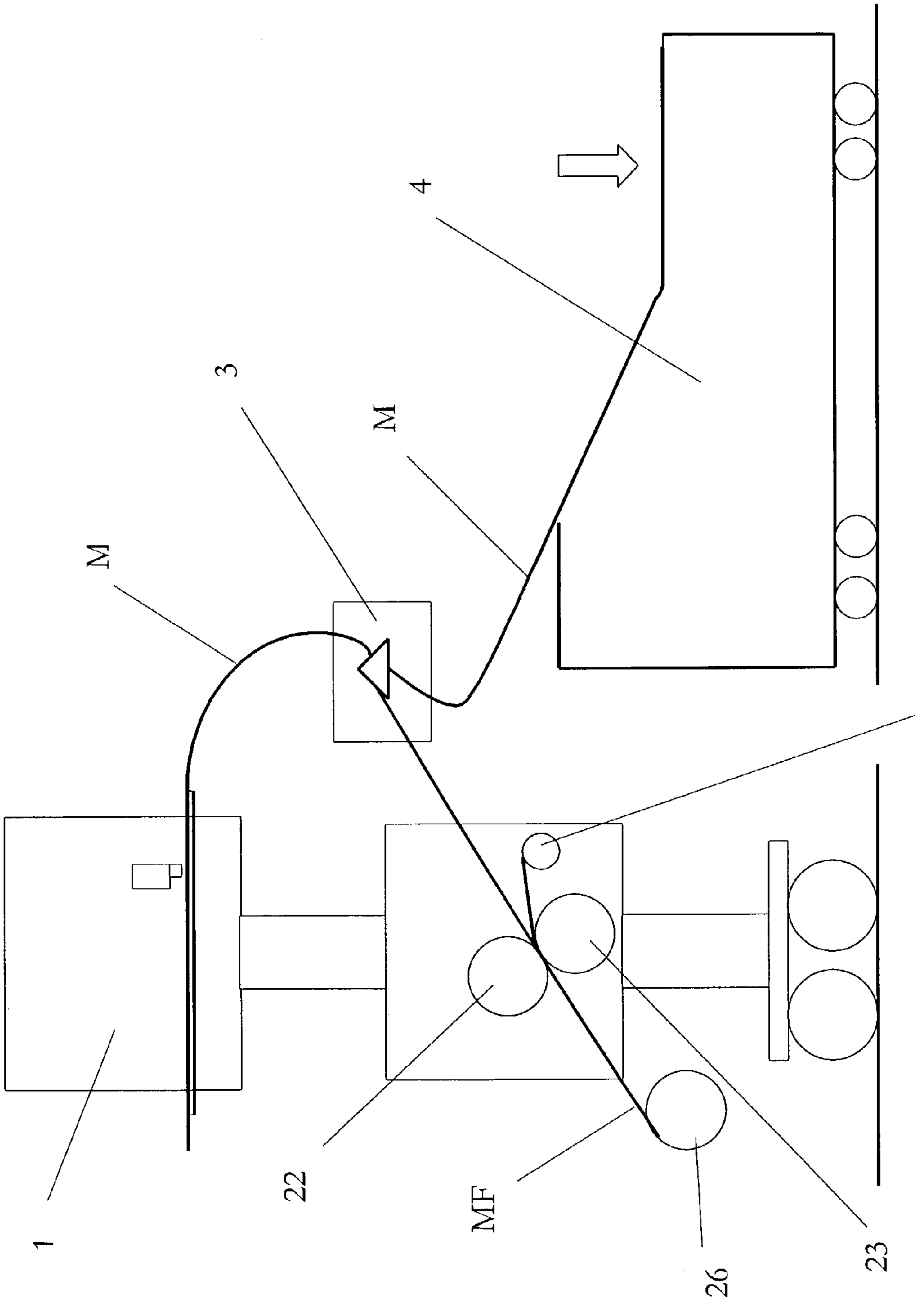
FIG. 2 is a schematic view of a printing device according to a second embodiment.

FIG. 2 shows an embodiment of the apparatus of the invention, which also allows to laminate some of the plots and leave others free from film, without the need of user intervention and avoiding media waste.

The apparatus shown in FIG. 2 also comprises a printing device 1 and a laminator device 2, but in this case a cutting and switching device 3 is inserted in the media path between them, in order to cut the media M between each two plots and direct each plot towards the laminator 2 if it has to be laminated or towards a stacker 4 if it doesn't have to be laminated.

It has to be pointed out that a cutting device for the media may also be associated to the printer itself, and the device 3 may be simply a switching device.

The printer informs the cutting and switching device 3 of the destination for each outputted plot, and the device 3 directs the leading edge of the plot accordingly.

The plots that are directed to the laminator are then fed between the laminator rolls 22,23.

In this case all the plots that travel through the laminator are provided with a film F, and the film is not cut between plots: after each plot is laminated the film F is advanced a small length before the next plot is fed to the laminator, in order to leave a separation between two consecutive plots; the film is therefore used to join the plots to each other and to allow them to be wound on the take-up reel 26. The result is a web of continuous film onto which the plots are laminated and which is stored on the take-up reel.

On the other hand, the plots that are not laminated are driven by the switching device 3 towards the stacker 4, where they are piled up on each other.

The printer informs the laminator, for each plot, if the laminating operation has to be performed or not, and the control means of the laminator cause the device to perform the necessary steps, as explained above.

For this operation, it is foreseen that a printing file for inputting a printing and laminating job in the apparatus comprises a data structure including a variable associated to the laminating operation, such that the control means of the apparatus may read the value of such a variable and control the laminator device such that it laminates or not the corresponding plot.

An example of the command portion of a printing file including a command with a "lamination" variable may be as follows. The example corresponds to a Hewlett-Packard ink-jet printer; the part of the file with the data to be printed and the end of job sequence have been omitted.

```
ESC%-12345X@PJL JOB NAME = "Microsoft Word - Document1"
@PJL SET STRINGCODESET = UTF8
@PJL SET JOBNAME = "Microsoft Word - Document1"
@PJL SET TIMESTAMP = "20001121141158"
@PJL COMMENT SET DRIVERVERSION = v5.00 ( WinNT )
@PJL SET MIRROR = OFF
@PJL SET PALETTESOURCE = SOFTWARE
@PJL SET RENDERMODE = COLOR
@PJL SET COLORSPACE = SRGB
@PJL SET RENDERINTENT = SATURATION
@PJL SET RET = OFF
@PJL SET PRINTQUALITY = DRAFT
@PJL SET MAXDETAIL = ON
@PJL SET PRINTAREA = FULLSIZE
@PJL SET RESOLUTION = 300
@PJL SET PAPERLENGTH = 7923
@PJL SET PAPERWIDTH = 6120
@PJL SET ORIENTATION = PORTRAIT
@PJL SET MARGINS = NORMAL
@PJL SET LAMINATE = ON
```

The last line indicates that the plot which corresponds to this printing file will be laminated. If the variable is set to "OFF", the plot is not laminated.

An alternative, or a complement, to lamination information in the printing file is to give the user the possibility of selecting from a control panel of the apparatus if a particular plot has to be laminated or not.

Another embodiment of the invention foresees a simplified system, in which the media may be cut in the printer at the end of each plot, and the leading edge of each plot may be automatically fed to the laminator and laminated, unless the user manually conducts it towards a different path or a different take-up reel.

In this case, alarm means of any kind may be foreseen to warn a user that a plot not intended for lamination is about to be printed or outputted from the printer; it may also be foreseen that such a plot is only started when the user confirms the operation.

Figure 3:
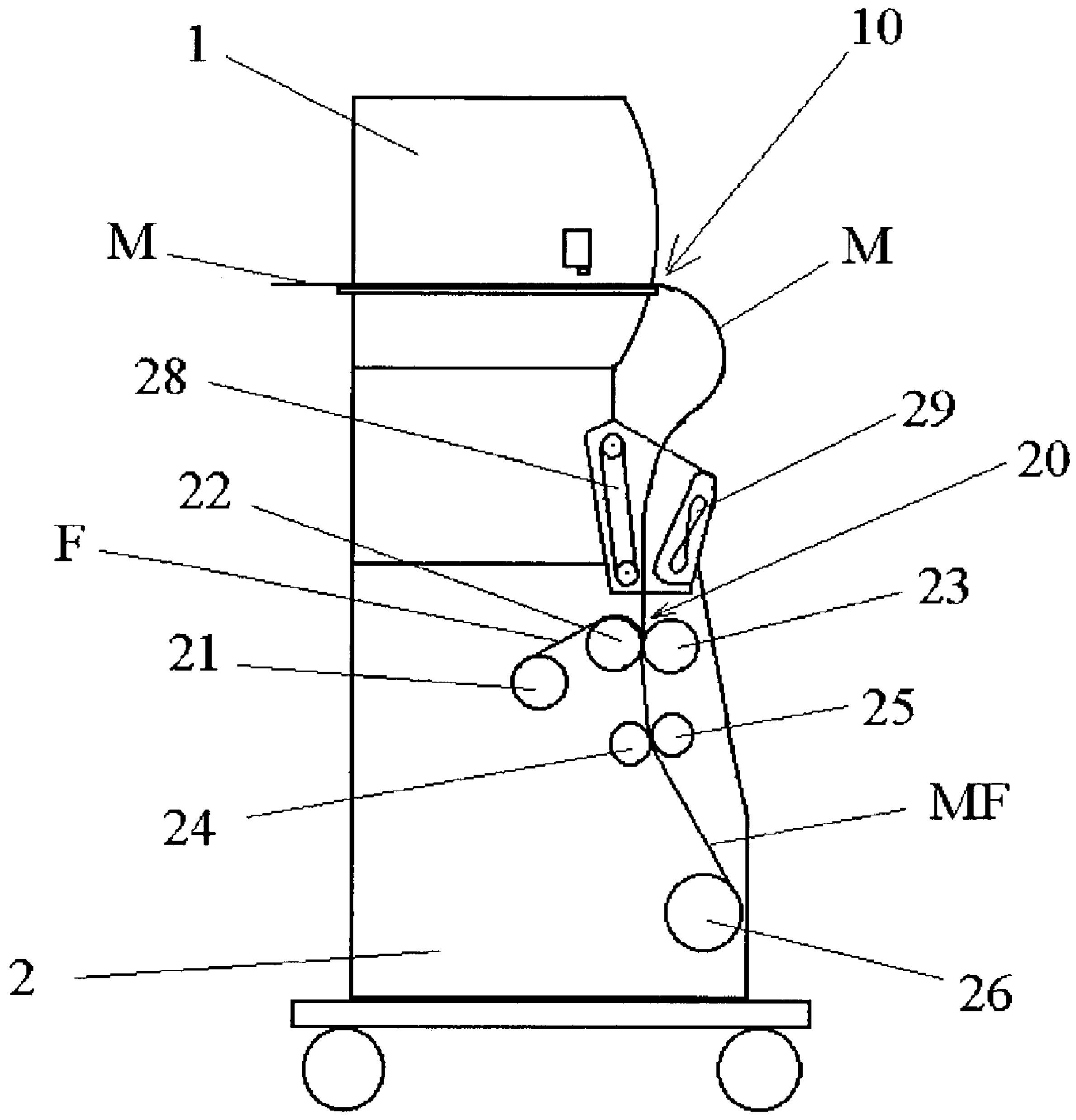
FIGS. 3 and 4 show an embodiment of the apparatus provided with means for feeding media to the laminator.
Figure 4:
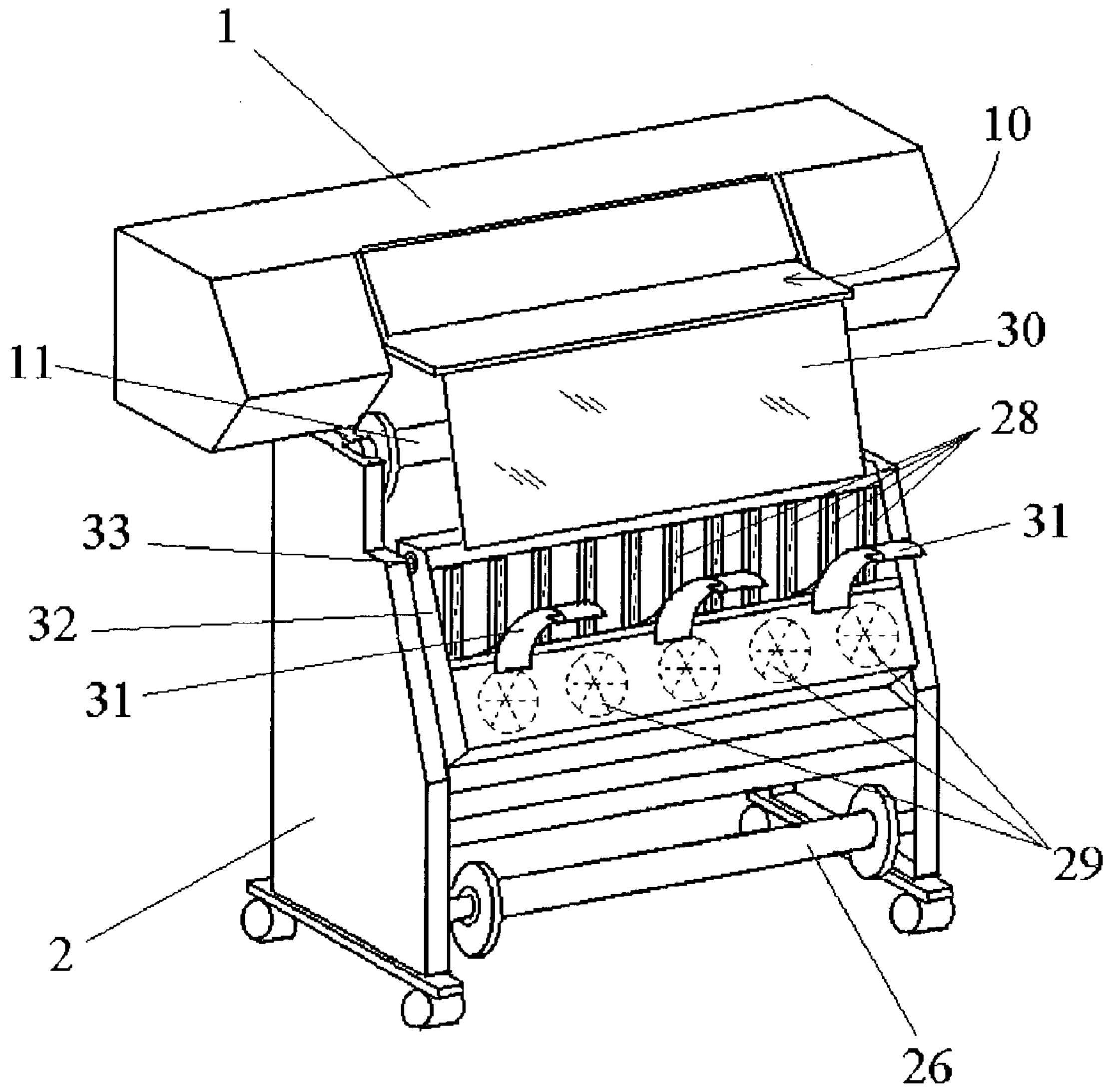

An embodiment of the invention which allows this mode of operation, in which the media is cut at the end of a plot, is shown in FIGS. 3 and 4; the apparatus has here a different layout of the laminator elements, and it comprises a feeding device 28,29 for feeding the media to the laminator. Elements of this embodiment that are similar to those of the previous figures have the same reference numerals and will not be described again.

FIG. 3 is a schematic view showing the position of the feeding device, which comprises conveyor belts 28 and fans 29 arranged along the media path between the outlet 10 of the printer and the inlet 20 of the laminator.

FIG. 4 shows the apparatus in perspective without any media loaded. The figure shows a blank media reel 11, from which the media is fed to the printer 1, and also the take-up reel 26 described above.

The feeding device includes a plurality of conveyor belts 28 arranged parallel to each other and with their feed path in substantially vertical direction, and a plurality of fans 29 which are arranged side-by-side and facing the conveyor belts 28, the fans and belts being arranged on opposite sides of the media path, upstream of the laminator.

Fans 29 are shown in phantom lines in FIG. 4 because they are not visible in this perspective.

The fans 29 generate an air stream such as to urge the media towards the conveyor belts 28, and the latter are set in motion to guide the leading edge of the media with an adequate orientation.

In the example, the conveyor belts 28 are made of high-friction rubber, and they are about 19 mm wide; they are spaced about 75 mm from each other (between centres), in order to provide enough support and friction surface for the flexible media and at the same time allow air flow between the belts in the region that is not covered by the media when the latter is narrower than the maximum admitted width, thus helping reduce the air flow towards the laminator.

The conveyor belts 28 could be replaced by a different type of transport means able to drive the media by friction, such as an array of wheels with a high-friction surface, e.g. made of rubber.

Similarly, the fans 29 could be replaced by other elements, e.g. a vacuum system arranged behind the conveyor belts to create a depression to attract the media towards the belts by vacuum.

The fans system, vacuum system or other air stream generating system could be located in a different position in the apparatus, and the air stream could be conducted towards the media and the belts by means of tubing.

In order to prevent the edge of the media leaving the printer from missing the space between the fans and belts, the apparatus further comprises deflectors 30 and 31 arranged at either side of the media path upstream of the fans and belts.

The deflectors allow unattended operation of the apparatus; they are not needed if a user manually guides the leading edge of the media to enter the space between conveyor belts 28 and fans 29.

In the embodiment shown in FIG. 4, deflector 30 is a sheet of flexible material, such as plastic, removably mounted between the outlet 10 of the printer and the upper edge of the belts 28. Deflector 30 prevents the leading edge of the media from deviating towards the apparatus, where it could get caught in the media feed roll or in other parts of the device. The deflector 30 is removable in order to allow access to the inner parts of the apparatus, and it could be replaced by a rigid metal cover or other suitable housing element.

On the other side of the media path, a plurality of outer deflectors 31 prevent the media edge from falling outwards and missing the space between fans 29 and belts 28.

Deflectors 31 are sloped and curved and project outwards, as shown in FIG. 4, so as to conduct the media edge towards the space between the belts and fans: for this purpose, the base of the deflectors 31 is positioned on the housing of the fans, at about 50 mm from the belts 28, while the upper side of the deflectors 31 is spaced about 140 mm from the belts and the deflector 30.

Deflectors 31 are made of a plastic material including about 2% of an antistatic component, and are coated with a sheet of polypropylene about 0.5 mm thick for preventing the deflector from damaging the printed plot when they come into contact.

The described dimensions and surface coating of deflectors 31 are also convenient for the purpose of guiding the trailing edge of the media at the end of a plot, as will be explained later on with reference to FIGS. 8 and 9.

The conveyor belts 28 and fans 29 are arranged in a housing 32 (FIG. 4) which can be pivoted with respect to the apparatus by virtue of a hinge axis 33; this allows access to the inner part of the laminator 2 for maintenance and cleaning operations and in order to load the lamination film, if needed.

The deflectors 31 are mounted on the housing 32, and the lower edge of deflector 30 also may be removably fixed to it.

The operation of the apparatus with the fans and conveyors system will now be described.

Figure 5:
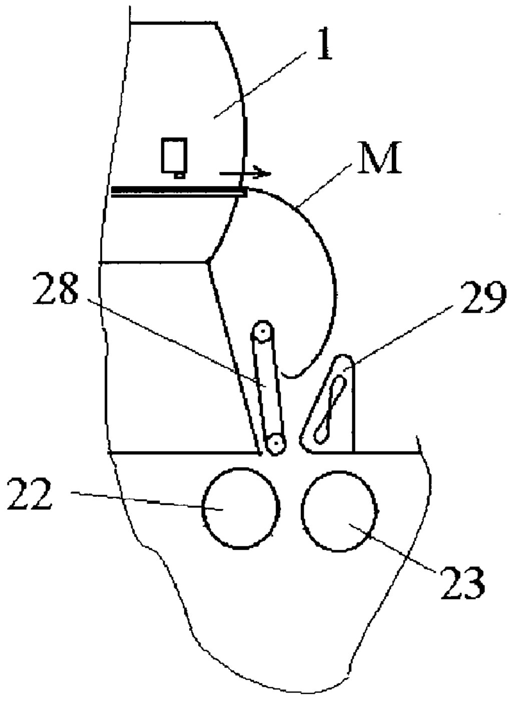
FIGS. 5 to 11 show the feeding device of the apparatus of FIGS. 3 and 4 in different steps of operation.

FIGS. 5 to 9 show different steps of the feeding operation: in FIG. 5, a leading edge of the media M leaving the printer advances towards the laminator with a degree of curling, which will vary from case to case depending e.g. on the type of media and the density of ink in the plot.

Figure 6:
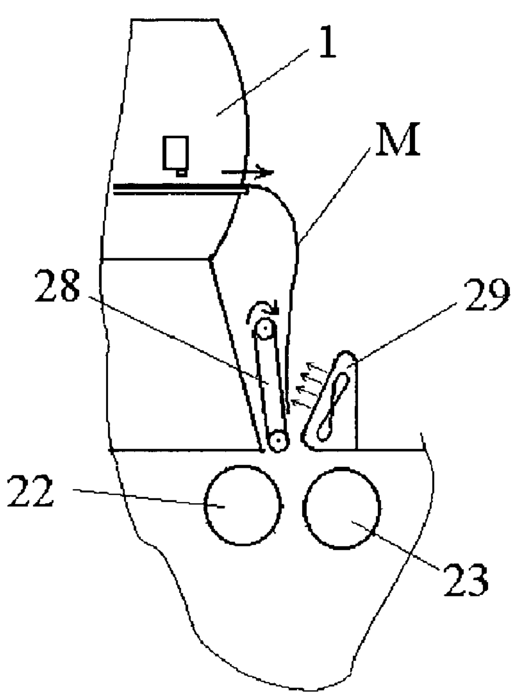

When the media edge reaches the space between the fans 29 and conveyor belts 28, the fans are powered and the belts start to advance in the direction shown by the arrows in FIG. 6, at a speed of about 100 mm/sec, thus faster than the media advance speed, such that the belts tend to pull the media edge downwards and undo the curling, and to straighten the media and exert a degree of downward pulling action thereon; this ensures a more uniform positioning of the media edge along all its width and thus avoids skew of the media when its leading edge enters the laminator.

The fans urge the media towards the belts in order to ensure enough friction between them.

Figure 7:
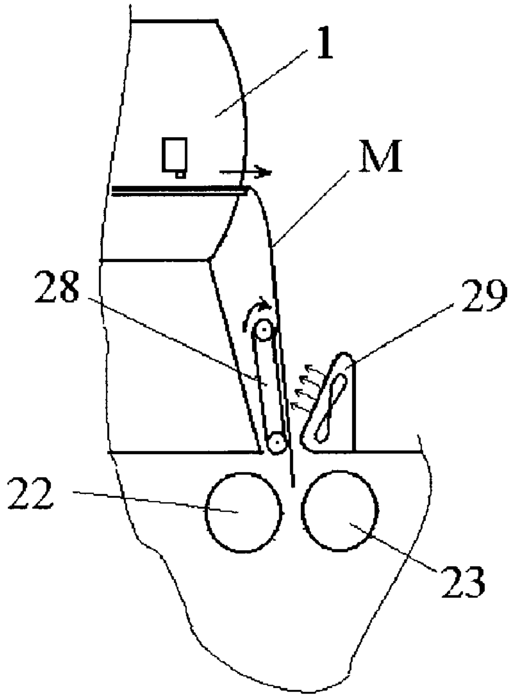

FIG. 7 shows the situation in which the leading edge of the media approaches the lamination rolls 22,23. There are then two possible ways of operation, as described hereinafter.

According to one embodiment, after the leading edge of the media travels through the laminator rolls 22,23 the rolls are closed (FIG. 8) gripping the media M and the film F, the latter not being shown in FIGS. 5 to 9 for the sake of clarity.

According to an alternative embodiment, it is also possible to close the lamination rolls before the media edge reaches them, and start laminating film without media; the conveyor belts feed the media until its leading edge enters between the lamination rolls which are already rotating.

Figure 9:
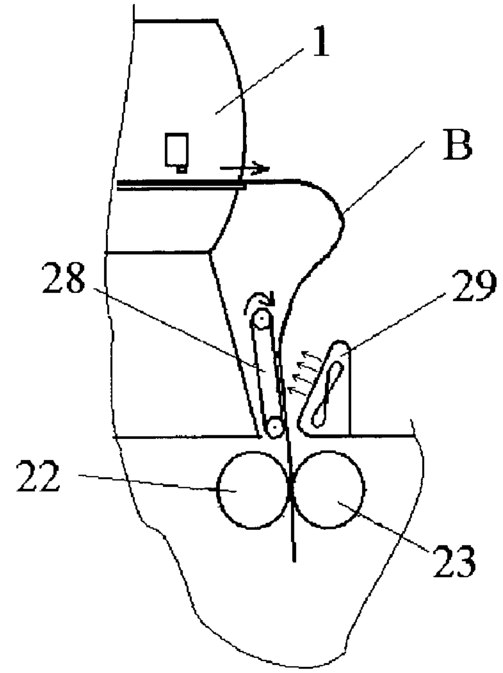

In both cases, once the edge of the media is caught between the laminator rolls, as shown in FIG. 9, the conveyor belts 28 and fans 29 work to form the media buffer B in a position upstream of the feeding system 28,29: for this purpose the conveyor belts 28 and the driving rollers 24,25 of the laminator are slowed down, such that the advance of the media in the laminator is smaller than the advance of the media in the printer, and a length of media buffer is formed.

The air stream generated by the fans 29 and the friction of the media with the belts 28 force the buffer to remain upstream of the feeding system: this allows to control the shape of the buffer and also prevents the printed side of the media from contacting the surfaces of the housing of the apparatus, throughout all the printing and laminating process.

During normal operation of the apparatus, when the printer and the laminator are working on the same plot or web of media, the fans and belts also maintain the correct angle of entrance of the media to the laminator; the fans and belts may also be used to slightly slow down the media in this region (this is done by driving the belts with a speed lower than that of advance of the media in the laminator, or stopping them completely), thereby generating a slight back tension in the media before it enters the laminator: this helps the media enter the laminator free from wrinkles.

Figure 10:
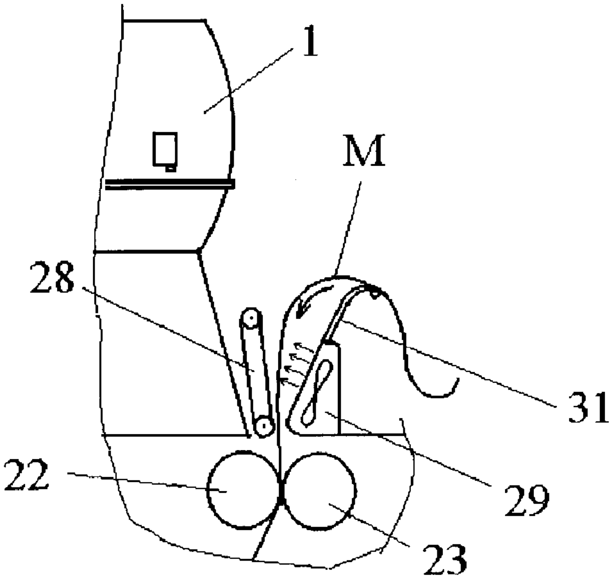
Figure 11:
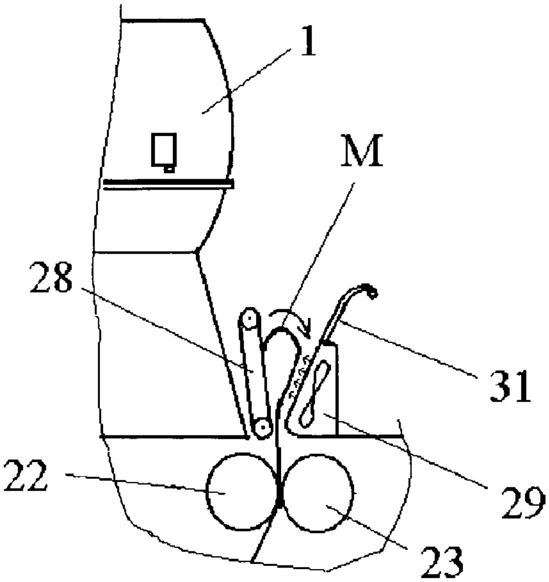

FIGS. 10 and 11 are views similar to those of FIGS. 5 to 9, but show the fans 29 and belts 28 in operation to guide the trailing portion of a plot towards the laminator. In these figures the deflectors 31 have been depicted in order to appreciate their function in this stage of operation.

Figure 8:
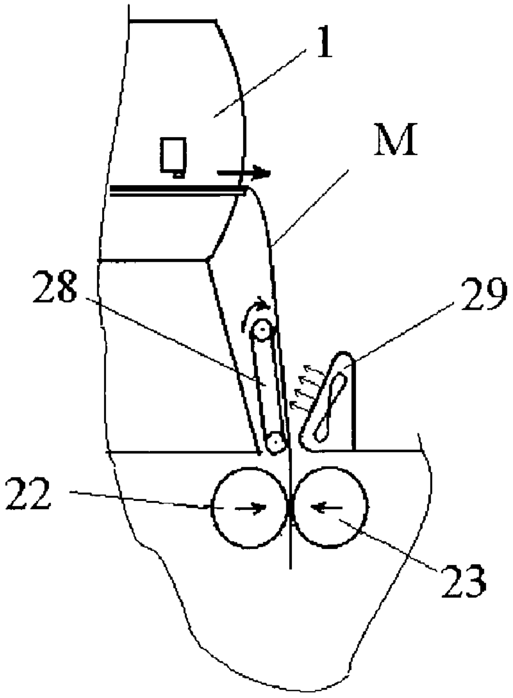

When the media is cut between two plots, the trailing portion of the plot that is already being laminated falls outwards, as shown in FIG. 8. In this condition, the printed side of the media contacts the deflectors 31: the material and surface finish of these deflectors are adequate for avoiding damaging the printed plot.

As the media travels towards the laminator, and due to curling, the trailing edge of the media enters the space between the fans and belts in the wrong direction, as shown in FIG. 11.

In this situation, the belts are advanced very slowly, and they may even be stopped or driven upwards; thus, the belts function to retain the trailing edge of the media and push it upwards until the rest of the media has gone through the laminator and the trailing edge is pulled by the laminator in the correct direction.

Thus, the fans and belts also have the function of controlling the trailing edge of a plot until it safely enters the laminator.

Finally, the fans may also contribute to some extent to the drying of the printed plot before it is laminated.

The operation of the fans 29 and belts 28 is controlled by the control means of the apparatus (not shown) to be adequately synchronised with the advance of the media in the laminator, the closure of the laminator rolls 22,23 and driving rollers 24,25, and so on.

The conveyor belts 28 may be powered by means of a transmission from the driving rollers 24,25 of the laminator, or they can have an independent drive. The latter case has the advantage of easily allowing higher speeds for the belts in certain steps of operation, which is useful for avoiding skew, as explained above.

The apparatus may include sensor means to control when the leading edge of the media reaches the region of the belts and fans, or alternatively this may be estimated by counting the length of media that has left the printer.

It should be pointed out that the feeding device shown in the embodiment of FIGS. 3 and 4 may similarly be applied to any other embodiment of the apparatus, for example those described with reference to FIGS. 1 and 2.

Sometimes, for example in the case of short plots, it may be desirable to chain together two or more plots, instead of cutting the media after each of them.

Chaining of plots may also be performed when several consecutive plots are intended to be laminated and between them it is not necessary to output blank media or cut the media: this may happen when the stop of the printer required between the plots is relatively small, and it is enough to reduce the lamination speed and use up part of the media buffer in order to allow the lamination of each plot to be finished while the web of media is at rest in the printer.

The stop of the printer between plots depends e.g. on the printer type (i.e. if it is a normal printer or it is a postscript printer or it is linked to a computer) and on the format of the data of the printing file.

In one embodiment, it is foreseen that the apparatus will initially try to chain consecutive plots, by slowing down the laminator and controlling the buffer length, and it will only cut the media if it determines that the printer is not starting a new plot soon enough to guarantee the maintenance of a minimum buffer. This may be due to the time needed for internal operations of the printer, or simply to the fact that there isn't any new job in the printer.

As can be seen, in the embodiments shown in the figures the laminator 2 is arranged substantially below the printer 1, with its inlet 20 on the same side of the printer outlet 10.

This layout has the advantage of taking up little floor space and allowing access to the printer for maintenance operations; furthermore, the printed side of the media is kept facing outwards and therefore prevented from contacting parts of the apparatus that may damage the plot.

With some of the described embodiments, and once the web of media is fed through the apparatus, a user simply needs to program in the printer the different plots to be prepared, indicating for each plot if it needs laminating or not. The apparatus will then perform the work, plot after plot, in an automated and unattended manner.

One of the embodiments described requires manual intervention if the user wants to avoid laminating one of the plots, if there is no switching device; however, it still affords unattended operation while all the plots have to be laminated, and has the advantage of a simpler construction.

The printing apparatus with an integrated laminator may be produced and made available as a single unit, but alternatively the laminator may be produced and made available as a kit to be attached to an existing printer, with or without modifications of the latter. Such modifications may consist simply in changes in the user interface and control means of the printing device.

Apart from integrated printing and lamination of a web of media as described above, the laminator device 2 of the apparatus may also operate according to two further modes.

It can be used similarly to a stand-alone, off-line laminator, by feeding any desired plot or media to the rolls 22,23, driving rollers 24,25 and take-up reel 26; and it may also be used purely as a wind-up unit for the printer 1, leaving the rolls 22,23 open and inactive.

In both cases, these operation modes may be enabled by the printer, and users may interact with the laminator through the printer control panel.

The invention claimed is:

1. A printing apparatus comprising:

a printer, a laminator device, and a feeding arrangement for feeding to said laminator device, in an integrated operation, media that is outputted from said printer, wherein said media is a web of media on which are printed several consecutive plots, said apparatus comprising:

means for performing lamination only on selected portions of the print media wherein in a first mode of operation a continuous length of media is configured to engage both in the printer and the laminator device, and form a loose media buffer between the printer and the laminator.

2. A printing apparatus as claimed in claim 1, wherein said means for performing lamination only on selected portions of the print media comprise means for cutting the media at the outlet of the printer at a final stage of the first mode of operation.

3. A printing apparatus as claimed in claim 1, which further comprises a switching device for selectively directing the leading edge of the media that leaves the printer towards the feeding means of the laminator device in an initial stage of the first mode of operation or towards non-laminated media storing means in an initial stage of a second mode of operation.

4. A printing apparatus as claimed in claim 1, wherein said printer is an inkjet printer.

5. A printing apparatus as claimed in claim 1, wherein said printer is a large-format printer which is able to handle media of a width of more than 24 inches.

6. A printing apparatus as claimed in claim 1, wherein following lamination said selected portions of the print media which have been laminated are supported on at least one continuous web of a lamination film, whereby said film acts as a carrier for said media.

7. A laminator device, said device being built as a kit which can be attached to a printing apparatus as claimed in claim 1.

8. A printing apparatus according to claim 1, further comprising memory means for storing printing data and at least a variable for lamination instructions, said variable being readable by control means of the printing apparatus for controlling lamination of a printed plot associated to said printing file.

9. A printing apparatus as claimed in claim 1, wherein at least a portion of the loose, continuous media buffer is free of support by a structure separate from the media.

10. A printing apparatus comprising:

a printer, a laminator device, and feeding arrangement for feeding to said laminator device, in an integrated operation, media that is outputted from said printer, said apparatus comprising:

means for performing lamination only on selected portions of the print media, wherein the laminator device is arranged below and under the printer so that a continuous length of the media, which is configured to simultaneously engage in both the printer and the laminator, can extend downwardly from the printer to the laminator device to form a loose buffer between the printer and the laminator device.

11. A method for printing and laminating media, comprising printing on a media in a printer, wherein said media is a web of media on which are printed several consecutive plots, feeding at least part of said print media to a laminator device in an integrated operation wherein in a first mode of operation a continuous length of media is configured to engage both in the printer and the laminator device, and form a loose, media buffer between the printer and the laminator, and performing lamination only on selected portions of said print media.

12. A method as claimed in claim 11, which comprises cutting the media at an outlet of the printer at a terminal stage of the first mode of operation.

13. A method as claimed in claim 12, further comprising selectively directing the leading edge of the cut media that leaves the printer towards feeding means of the laminator device in the first mode of operation or towards non-laminated media storing means in a second mode of operation.

* * * * *